Aug. 30, 1932.   J. M. MILAN   1,875,095
BRAKE
Original Filed Aug. 19, 1929   2 Sheets-Sheet 2

Inventor
Joseph M. Milan

By Clarence A. O'Brien
Attorney

Patented Aug. 30, 1932

1,875,095

UNITED STATES PATENT OFFICE

JOSEPH M. MILAN, OF INDIANAPOLIS, INDIANA, ASSIGNOR TO MILAN BRAKE COMPANY, LIMITED, OF NEVADA, A CORPORATION OF NEVADA

BRAKE

Original application filed August 19, 1929, Serial No. 386,947. Divided and this application filed October 4, 1930. Serial No. 486,426.

This invention appertains to new and useful improvements in brakes and is a division of my co-pending application Serial No. 386,947, filed August 19, 1929 for brakes.

The principal object of this invention is to provide a brake of approved construction to exclude the entrance of water so that there will be no likelihood of the parts freezing and consequently slipping in cold weather.

Another important object of the invention is to provide a brake capable of mechanical and fluid operation.

Still another object of importance is to provide a brake wherein the braking elements are self adjusting, thus eliminating the necessity of frequent adjustments such as are now required in conventional brake structures.

A further object of the invention is to provide a brake which will be positive acting in operation and yet does not permit the braking element to contact when the brake is not applied, thus reducing work which would be otherwise occasioned by loosely contacting braking elements.

Various other important objects and advantages of the invention will be found in the following specification.

Figure 1:
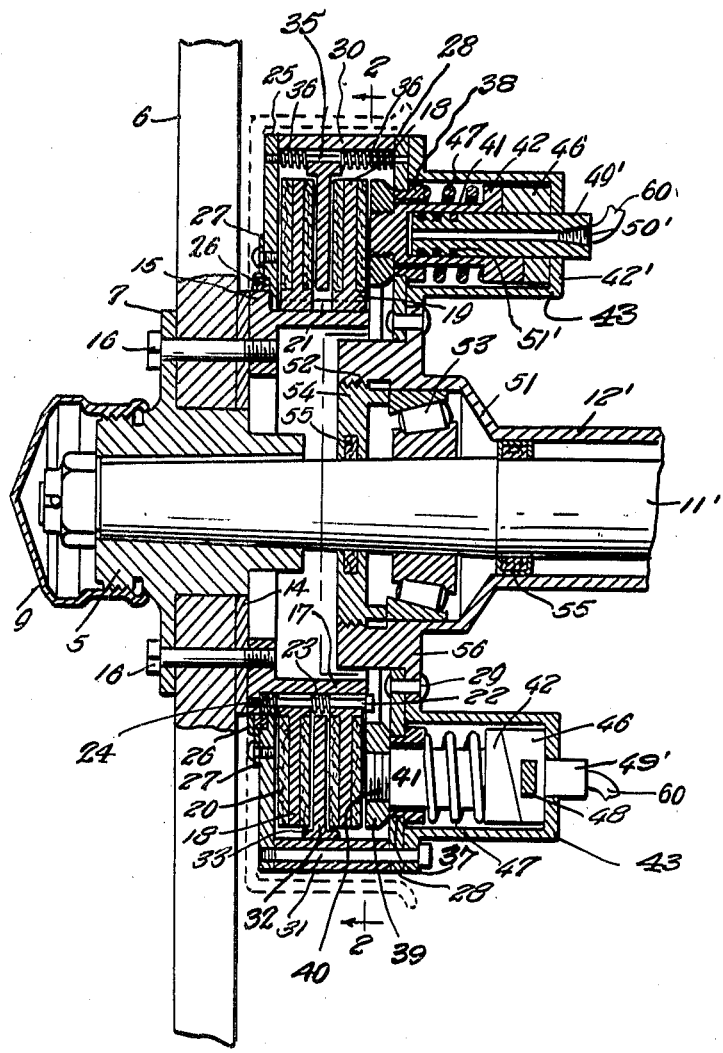
Figure 1 represents a fragmentary vertical sectional view through the brake structure in its entirety.

Referring to the drawings wherein like numerals designate like parts, it can be seen that the hub 5 from which the spokes 6 radiate in the usual manner for connection to the felly (not shown in the drawings) is provided with the usual circumferentially extending flange 7, while the outer end portion of the hub is externally threaded to receive the usual cap 9. Bolts 16 extend through the flange 7 of the hub, through the spokes 6 and annulus 14 for threaded engagement within threaded openings of a ring 15. The ring 15 is provided with a cylindrical wall 17 protruding therefrom for slidably supporting the brake element.

The brake elements include a pair of rings 18—18, which are enlarged at their inner edges as at 19 to provide shoulders against which the annular friction plates 20 may abut. There is a friction plate 20 for each side of each of the rings 18 as is clearly shown in Figure 1. The enlarged edge portion 19 of each ring 18 is provided with a plurality of slots extending transversely thereof and at predetermined positions on the periphery thereof for receiving the teeth 21 which radiate from the aforementioned cylindrical protuberance 17.

Certain openings are provided in the enlarged portions 19 of the rings 18 for registry with the spaces between certain pairs of the teeth 21 on the cylinder 17 for the purpose of receiving an elongated pin 22, which pin extends through both of the rings 18 at their enlarged inner edge portions in substantially the manner shown in Figure 1. There may be any suitable number of these pins 22 and they are threadedly engaged within openings in the ring 15.

Interposed between the enlarged portions of the rings 18 and circumscribing each pin 22 is a compressible spring 23 and another compressible spring 24 is provided on each pin between the ring 15 and the adjacent ring 18.

A circular plate 25 has its inner edge portion reduced for receiving a packing strip 26 and a rim 27 is secured to the circular plate 25 and is bent over the packing strip 26 in the manner shown in Figure 1 to prevent displacement thereof. An annular plate 28 is arranged in parallel relation with respect to the plate 25, the center portion thereof being open to receive the enlarged ends of the axle housing. Rivets 29 are employed for securing the annulus 28 at its inner edge portion to the axle housing, while a cylindrical band 30 is interposed between the outer edge portion of the plates 25 and 28. The ring 30 is provided with transversely extending bores for registry with openings in the edge portions of the plates 25 and 28 for receiving the tie bolts 31 whereby the aforementioned plates 25 and 28 are snugly clamped against the said cylindrical band.

Figure 2:
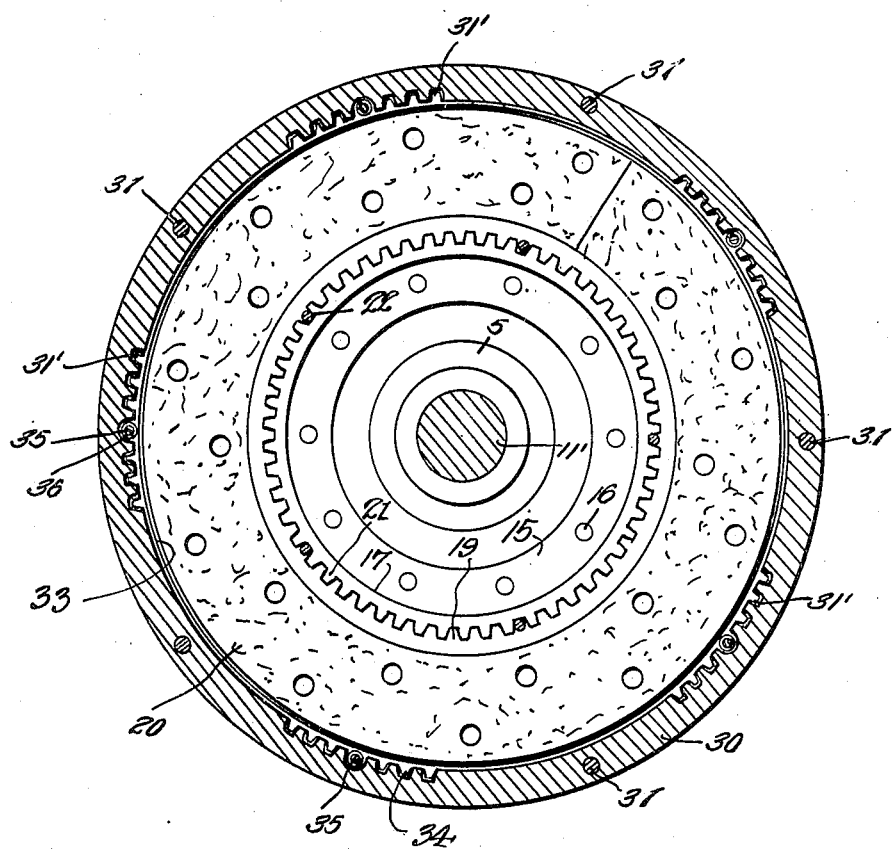
Figure 2 represents a vertical sectional view through the brake structure taken substantially on line 2—2 of Figure 1.

As is clearly shown in Figure 2, the band is provided at predetermined points on its inner side with groups of transversely extending channels 31' and a slidable band 32 is transversely slidable within the said band 30, the same being provided with a peripheral enlargement 33 having teeth 34 thereon for mesh with the transverse channels 31' of the band 30.

This relation of the annulus 32 with respect to the band 30 permits transverse sliding movement of the said annulus within the confines of the band. Certain openings are provided transversely on the peripheral enlargement 33 for registry with certain of the channels 31' for receiving pins 35. On each pin 35, a pair of coiled springs 36—36 are arranged, the same being interposed between the plates 25 and 28 and the corresponding sides of the peripheral enlargement 33, whereby the annulus 32 is centralized within the band.

As is shown in Figure 1, the annular plate 28 is provided with a pair of openings 37 arranged at diametrically opposite points thereon. Arranged in each of the openings 37 is a shoulder bushing 38 and a follower ring 39 is interposed between the said annular plate 28 and the adjacent friction plate 20 on the brake element 18. The follower ring 39 is provided with threaded openings at diametrically opposite points in registry with the openings 37 and these openings serve to receive the threaded reduced ends 40 of the shanks 41 extending from the cam sections 42.

As is clearly shown in the drawings, cylindrical housings 43 are each open at one of their ends and this end is suitably connected to the exterior face of the plate 28. These housings are arranged over the openings 37 to inclose not only the cam sections 42 but also complementary cam sections 46, which when rotated have a cam action against the sections 42.

Interposed between each bushing 38 and the adjacent cam section 42 is a compressible spring 47 for maintaining the cam disposed in the manner shown in Figure 1 with the follower ring 39 spaced from the adjacent friction plate.

Each of the housings 43 has a circumferential opening therein through which the operating lever 48 protrudes. As the operation of these levers 48 are described and shown in the before-mentioned application, it is not thought necessary to show the openings in this application.

In Figs. 1 and 2 it can be seen that the axle is denoted by the numeral 11' while the axle housing is denoted by numeral 12' in Fig. 1, with the end portion adjacent the brake flaring to receive the roller bearing structure 53, which is interposed between the shaft 11' and the said flared portion of the axle housing.

A threaded bushing 54 is engageable with the threaded interior of the flared portion of the housing for retaining the bearing structure 53 against displacement, and suitable packings 55 are provided on opposite sides of the bearing structure 53 to prevent grease from seeping into the brake structure.

As is clearly shown in Figure 1, the flared portion 51 of the housing 12' is provided with a circumferentially extending flange 56 whereby the housing may be secured to the aforementioned annular plate 48 by means of the rivets 29.

It will thus be seen that this novel brake structure will be far move efficient and satisfactory in use from a mechanical standpoint than brakes now in use on automobiles used at present, and the following description sets forth how this brake is operated by fluid pressure.

As is clearly shown in Figure 1, the shanks 41 projecting from the cam sections 42 are hollow to accommodate the tube 49', which at its outer end is internally threaded as at 50' to receive a suitable coupling. The tube 49' is suitably secured to the outer end 42' of each housing 43 and the inner end thereof is provided with packing rings 51'.

It will thus be seen that fluid under pressure delivered through the pipes 60, from any suitable source, into the bores of the members 49' will act against the shank 41 to force the friction ring 39 against the adjacent brake element 30.

The spring means afore described are employed for equalizing and maintaining spaced the various parts of the brake mechansim so that there will be no friction of parts when the brake is entirely disengaged.

Thus it will be seen that when the brake is manually operated the levers 48 are actuated to any suitable means, for turning the members 46 which acts on the cams 42, to move the shanks 41 inwardly, and this movement of the shank will cause the ring 39 to press the brake elements 18 and 32 together, whereby the member 17 is attached to the wheel hub to frictionally connect it to the stationary housing composed of the parts 25, 28 and 30 so that the wheel will be braked.

When the brakes are operated by fluid pressure means, the fluid is introduced from any suitable source through the pipe 60 into the tube 49' so that this fluid will act against the shanks 41 to cause them to move inwardly and thus cause the ring 39 to compress the brake elements, as before stated.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

A brake comprising a drum, a pair of annular brake elements slidably connected to the drum, a stationary housing circumscribing the drum, a slidable ring at the inside of the housing for interposition between the brake elements, a cam operated plunger, a follower ring connected to the plunger and being engageable against one of said brake elements, spring means for normally maintaining the said plunger retracted, a housing for the said cam means, said plunger being hollow, and a tube projecting into the hollow plunger and being connected to a fluid pressure line, whereby the said plunger and follower ring may be operated.

In testimony whereof I affix my signature.

JOSEPH M. MILAN.